United States Patent [19]

Farber

[11] 4,371,436
[45] Feb. 1, 1983

[54] PRECIOUS METAL RECOVERY APPARATUS

[75] Inventor: Mark I. Farber, Orange, Conn.

[73] Assignee: Jeneric Industries, Inc., Wallingford, Conn.

[21] Appl. No.: 281,000

[22] Filed: Jul. 6, 1981

[51] Int. Cl.³ ............................................... B07B 1/04
[52] U.S. Cl. .................................... 209/268; 75/118 P; 209/355; 209/405; 209/399; 209/420; 210/456
[58] Field of Search ............... 209/355, 315, 268, 250, 209/311, 405, 397, 399, 392, 265, 266, 237, 374, 420; 210/337, 339, 456, 412, 913, 914; 266/170; 75/118 P, 109

[56] References Cited

U.S. PATENT DOCUMENTS

| | | | |
|---|---|---|---|
| 1,064,243 | 6/1913 | Naegelen | 210/337 X |
| 2,063,499 | 12/1936 | Hall | 209/374 X |
| 2,232,025 | 2/1941 | Glisan | 210/339 |
| 3,222,268 | 12/1965 | Clauss | 209/250 X |
| 3,370,705 | 2/1968 | Grulke | 209/265 X |
| 3,386,580 | 6/1968 | Grabarczyk | 209/355 X |
| 3,900,628 | 8/1975 | Stewart | 209/399 X |
| 3,943,754 | 3/1976 | Orr | 209/237 X |
| 4,078,916 | 3/1978 | Gerber | 75/118 P X |
| 4,174,276 | 11/1979 | Otness | 209/374 |
| 4,213,600 | 7/1980 | Thompson | 266/170 X |
| 4,233,151 | 11/1980 | Gundlach | 209/237 X |
| 4,289,241 | 9/1981 | Litrap | 209/44 |

FOREIGN PATENT DOCUMENTS

| | | | |
|---|---|---|---|
| 1083139 | 1/1955 | France | 209/237 |
| 7176 | of 1899 | United Kingdom | 210/337 |

*Primary Examiner*—Tim R. Miles

[57] ABSTRACT

Apparatus for recovering silver from spent photographic solutions comprises a tray with a number of non-reactive filter elements having successively smaller porosity through which the spent solutions can be passed. Each successive filter element prevents silver particles of progressively smaller sizes suspended in the liquid from passig therethrough. The filters are stacked in a horizontal position within the tray and a tray cover sits on top of the tray, the cover having an opening into which the developing solutions can be poured. The tray includes a drainage port which allows liquid passing through the filters to drain out of the tray.

9 Claims, 5 Drawing Figures

PRECIOUS METAL RECOVERY APPARATUS

BACKGROUND OF THE INVENTION

This invention relates to the recovery of silver from exhausted or spent photgraphic processing solutions such as photographic fix.

Several processes are known for recovering silver from photographic waste products. One technique involves a process where the waste products are burned under controlled conditions such that silver can be recovered from the ash. U.S. Pat. Nos. 2,944,886 and 3,671,222 relate to such techniques.

Other processes for the recovery of silver utilize chemical reactions. In U.S. Pat. Nos. 2,131,045; 3,547,987,986; and 3,960,550, silver sludge is produced from the waste material through chemical reaction and silver is subsequently recovered from the sludge. U.S. Pat. No. 3,832,453 discloses a process where silver is recovered from photographic waste solutions by mixing and reacting a first flowing stream of fixing solution with a second flowing stream of an aqueous sulfide solution to precipitate silver particles. The precipitated particles are then separated from the residual solution which can be reused.

A third method of reclaiming precious metals, such as silver, from solution is through the use of filters. In U.S. Pat. No. 2,643,108, silver is precipitated from a silver salt solution by zinc plates which are held within a fabric bag. In operation, the bag is placed into a tank containing hypo solution and the normal circulation of the liquid solution in the tank causes the liquid to flow laterally through the bag, between the lead plates, such that the silver salts held in solution are precipitated within the bag.

Other U.S. patents, such as U.S. Pat. Nos. 3,630,505; 3,744,995; and 4,240,617 deal with silver recovery units having fluid permeable metallic filter elements. In these devices, the silver-containing solution reacts with the metal of the filter element so that the silver is deposited therein. The metal filter elements are made of a metal above silver in the electromotive force series, such as steel wool or galvanized window screen. U.S. Pat. No. 4,213,600 shows a cylindrical container in which a plurality of fluid permeable layers of a chemical reduction agent are disposed in interleaved relation with a plurality of fluid permeable layers of a non-reactive filter material. A galvanic effect is used to precipitate silver in this apparatus.

All of the above-described prior art methods of recovering metals from solution require complex apparatus and/or the use of chemical reactions to separate desired components from undesired ones. It would be advantageous to have a simple, low cost and effective apparatus to recover precious metals, e.g. silver, which are suspended in a liquid, e.g. spent photographic developing solutions. Such an apparatus should be lightweight, of small size so that it can sit harmlessly on a counter top, and of fool-proof construction.

The need for such an apparatus, particularly for use by small scale processors of photographic films is heightened by the ever-increasing value of silver. Dentists and doctors, for example, currently dispose of photographic developing solutions which contain valuable amounts of silver. Costly prior art systems for silver recovery, designed particularly for use by large scale processors of photographic films, are impractical for small scale operations. Such prior art systems are not only too expensive for use by amateur photographers, doctors and dentists; they are also too complicated to use.

An ideal system for use by such small scale users would not require any additional steps over those already being used in the developing process. Such a system would not require the user to add chemicals, make frequent filter changes, or conduct preventative maintenance.

This invention relates to such apparatus.

SUMMARY OF THE INVENTION

In accordance with the present invention, apparatus is provided for recovering particles of a precious metal suspended in a liquid. The apparatus includes a tray and a plurality of non-reactive filters of successively smaller porosity through which a liquid containing particles can be passed. Each successive filter prevents precious metal particles of progressively smaller size suspended in the liquid from passing therethrough. Means are provided for supporting the filters in a horizontally stacked relation within the tray. A tray cover is provided which has an opening therein into which spent photographic solutions can be poured. A drainage port is provided in communication with the interior of the tray to allow liquid poured into the tray and passing through the filters, to drain out of the tray.

Each of the plurality of stacked filters can have a separate frame member. The frame would have a border to which the corresponding filter element can be affixed. The perimeter of each frame would fit in substantially leak-proof relation within the tray. Each frame could include a plurality of ribs for supporting adjacent, identically-shaped frames in raised, parallel, stacked relation thereto.

In order to maintain the plurality of stacked frames in raised relation above its bottom surface, the tray could include a plurality of ledges. Ribs on each of the frame members can be arranged to define a plurality of distinct filter sections within each frame. Ribs disposed between adjacent filter sections can have channels provided therein to allow the passage of liquid thereacross. This design will maintain a uniform level of liquid among each filter section of a frame as liquid is being poured therethrough.

The non-reactive filters can be made from screen cloth having mesh openings, the porosity of each filter being determined by the size of its mesh opening. One or more of the screen cloth filters can comprise monofilament polyester. An additional filter may be provided which comprises a blend of fiberglass strand and microfibers containing a flexible acrylic binder.

DETAILED DESCRIPTION OF THE INVENTION

Figure 1:
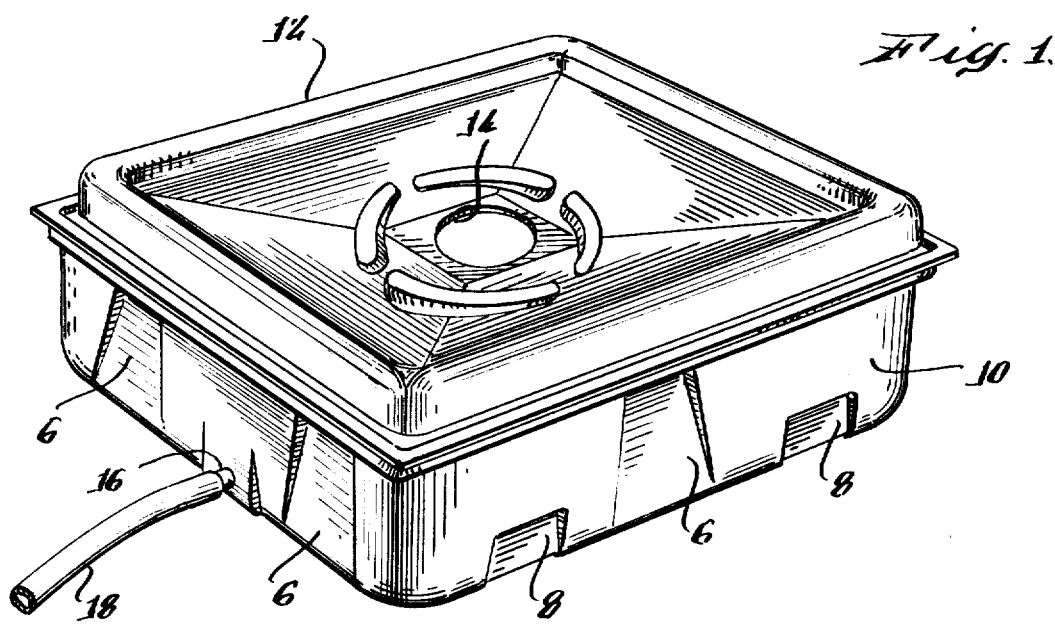
FIG. 1 is a perspective view of the outside appearance of an apparatus in accordance with the present invention.

As shown in FIG. 1, a tray generally designated 10 is provided having a top cover or lid 12. The top surface of lid 12 includes downwardly sloping generally trapezoidal panels which converge on center hole 14. The sloping shape of the top surface provides a funnel effect to facilitate the pouring of liquids into hole 14.

Tray 10 includes an outlet port 16 and may also include a drainage hose 18. Side and end panel wedges 6 are provided to guide filter elements into a proper snug fit within tray 10 as will be described in more detail hereinbelow. Ledges 8 provided in the side wall panels of tray 10 support filter elements within the tray, also described hereinbelow.

Figure 2:
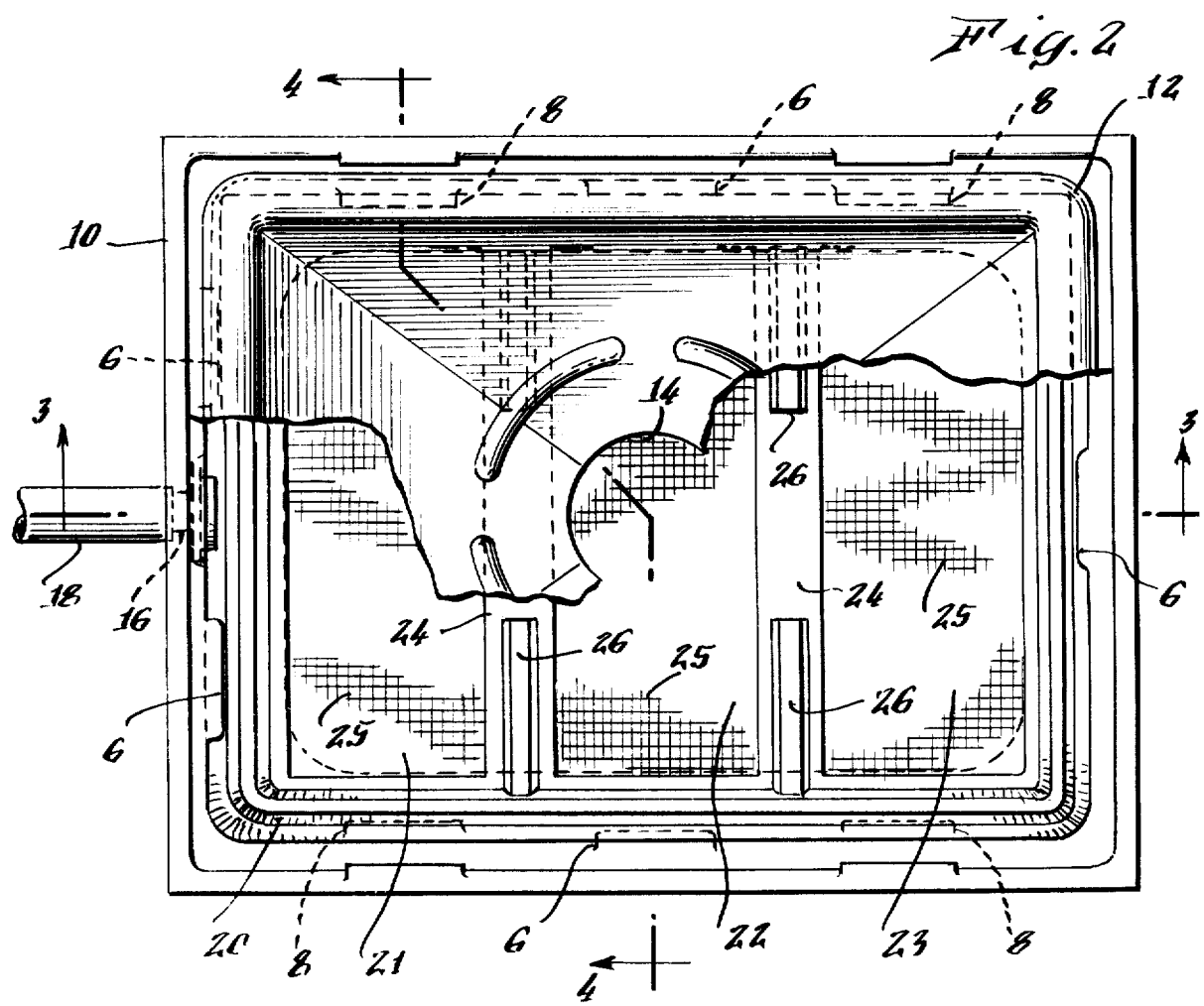
FIG. 2 is a top view of the apparatus shown in FIG. 1 with the top cover cut away to show the inside of the tray.

FIG. 2 is a top view of the tray assembly shown in FIG. 1 with lid 12 partially cut away to expose the top one of a plurality of filters stacked within the tray. A frame member 20 supports a porous filter element 25. Filter element 25 is affixed to the underside of frame 20 by a suitable adhesive. When the frame member is manufactured from polystyrene, a toluene solvent based adhesive has been found to give satisfactory results. The relationship between frame 20 and filter element 25 is shown in cross section in FIGS. 3 and 4.

Frame 20 includes three separate sections 21, 22 and 23 which are defined by ribs 26. Channels 24 are provided in ribs 26 to allow the passage of liquid thereacross, thereby maintaining a uniform level of liquid across sections 21, 22, and 23 while liquid is being poured through hole 14.

Figure 3:
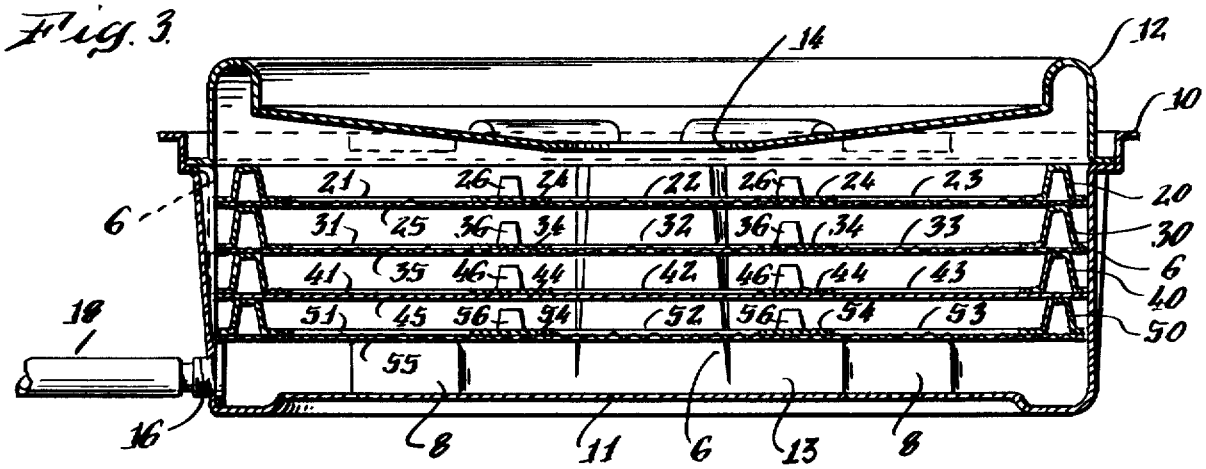
FIG. 3 is a cross-sectional view of an apparatus in accordance with the present invention taken substantially along the plane 3—3 in FIG. 2.
Figure 4:
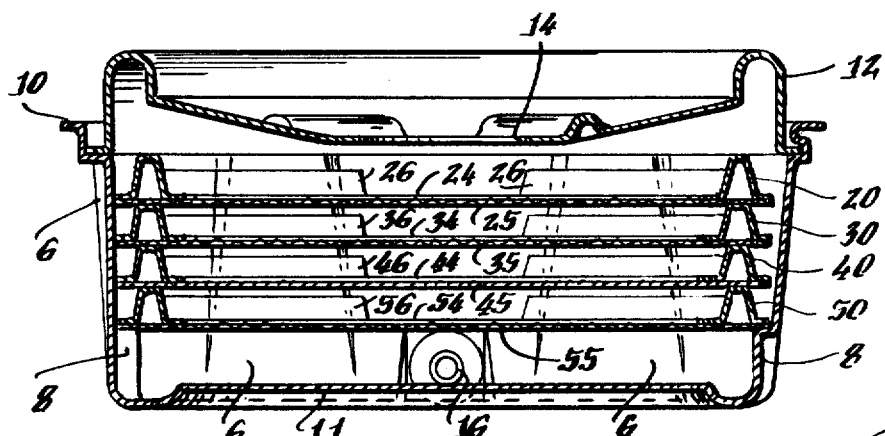
FIG. 4 is a cross-sectional view of an apparatus in accordance with the present invention taken substantially along plane 4—4 of FIG. 2.

As shown in FIG. 2, the outside perimeter of frame 20 rests snugly against the inside surface of wedges 6 in tray 10. As shown in FIGS. 3 and 4, wedges 6 also abut filter frames 30, 40 and 50. Wedges 6 also serve to prevent horizontally stacked frames 20, 30, 40 and 50 from rattling within tray 10.

As most clearly shown in FIGS. 3 and 4, a plurality of ledges 8 serve to support horizontally stacked frames 50, 40, 30 and 20 above tray bottom 11. The bottom surface of frame 50 rests directly upon ledges 8. Frame 40, in turn, rests on the top surface of frame 50. Similarly, frame 30 rests on frame 40 and frame 20 rests on frame 30. By supporting frame 50 and therefore frames 40, 30 and 20 in raised relation above tray bottom 11, ledges 8 provide a free area 13 to facilitate the proper drainage of liquids poued into hole 14 and passing through filters 25, 35, 45 and 55 out of tray 10 via drainage port 16.

Tray 10, cover 12 and frames 20, 30, 40 and 50 may be constructed of any material which is inert to the liquids with which the apparatus will be used. When such liquids comprise spent photographic developing solutions, these components can be made from high density polystyrene. In a preferred embodiment, tray 10 and tray cover 12 may be vacuum-formed from high density polystyrene having a thickness of 0.030 inches. Drainage port 16 can include a bushing manufactured from metal which is either riveted to a hole in tray 10 or threaded into such a hole.

Frames 20, 30, 40 and 50 are each identical, having ribs 26, 36, 46, and 56 respectively to define frame sections 21 to 23, 31 to 33, 41 to 43, and 51 to 53 respectively. Filter elements 25, 35, 45 and 55 affixed to frames 20, 30, 40 and 50 respectively are each of a different porosity.

Figure 5:
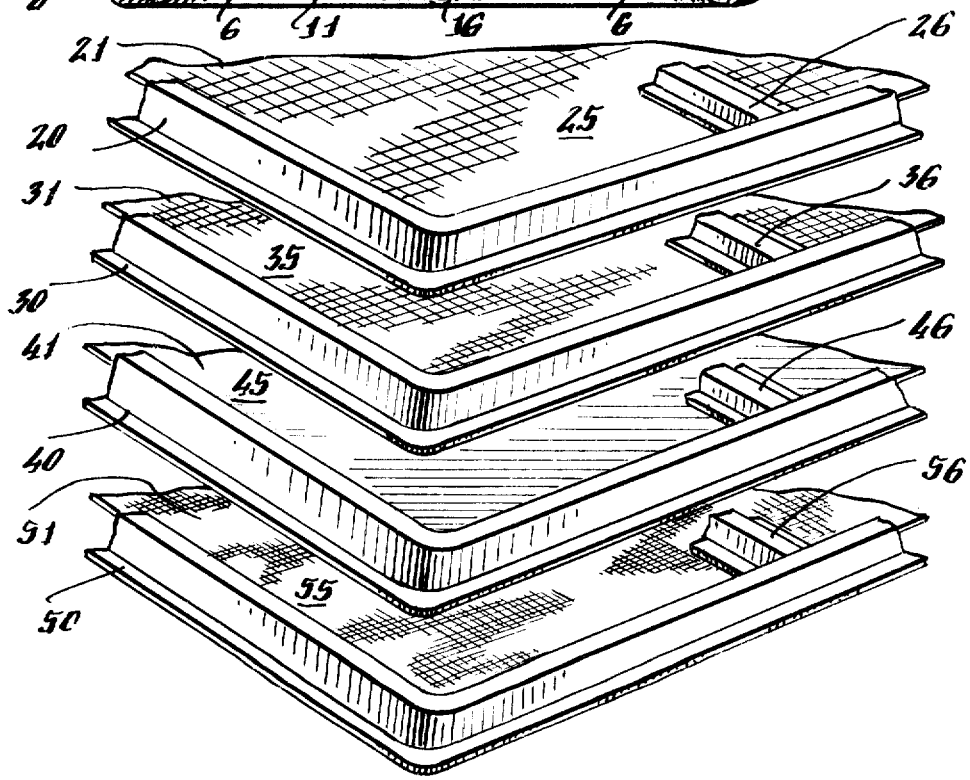
FIG. 5 is a perspective detailed view showing an arrangement of four filters in accordance with the present invention.

In recovering silver particles suspended in spent photographic developing solutions, a preferred embodiment comprises four horizontally stacked filters as shown in FIGS. 3-5. It is noted that a lesser or greater number of filters may be used in accordance with the present invention. For example, just two filters, supported by frames 40 and 50, can be provided. Alternatively, additional filters could be stacked above frame 20. In a preferred four filter embodiment, however, filters 25, 35 and 55 are manufactured from a monofilament polyester screen cloth such as that marketed by Jelliff Corporation of Southport, Conn. under the trademark "ESTERTEX". Filter 25, for example, may be Jelliff's product number P-350 having a mesh opening of 350 microns. Filter 35 may have a mesh opening of 330 microns and filter 55 may have a mesh opening of 305 microns. Filter 45 may consist of another layer of monofilament polyester screen cloth, or, alternatively, may be manufactured from a web of fiberglass strand and microfibers containing a flexible acrylic binder. One commercially available material which meets this description is sold under the registered trademark "DEXIGLAS" by the Dexter Corporation of Windsor Locks, Conn. The combination of two layers of monofilament polyester screen cloth, one layer of "DEXIGLAS", and a fourth layer of monofilament polyester screen cloth has been found to perform very well in separating suspended silver particles from spent photographic developing chemicals.

The apparatus of the present invention is particularly well suited for use in the office of a dentist who develops X-ray films. In taking X-rays, the dentist first exposes the film. He then takes the exposed film to his darkroom and dips and/or agitates it in a developing solution. The film is then dipped into a "fixer" solution. While in the fixer, particles of silver are liberated from the film. The dentist then washes the developed film in water.

Approximately every two weeks it is necessary for the dentist to change his chemicals. Typically, the dentist would merely throw his spent chemicals down his sink. With the apparatus of the present invention, instead of throwing the solutions down the sink, the dentist merely pours them into hole 14 in tray cover 12. The solution first hits filter 25 which separates out particles of silver that are larger in size than the mesh opening of the filter. Liquid with smaller particles passes through filter 25 and impinges upon filter 35. Again, some particles are filtered out of the liquid. Liquid with still smaller particles passes through filter 35 and impinges upon filters 45 and 55 respectively. Filter 45, when manufactured from "DEXIGLAS", serves to absorb some of the liquid, thereby slowing down the flow rate and spreading out the flow of liquid thereacross.

By using the apparatus of the present invention, a user of small volumes of photographic chemicals can recover some of the silver that he would otherwise merely dispose of. Without any further treatment of the waste photographic solutions, the small scale processor can recover suspended silver particles from the solutions merely by pouring the solutions into the apparatus of the present invention instead of into his sink. In order to increase the recovery of silver, before pouring his solutions into the apparatus, the user can add a chemical (e.g. in tablet form) to the spent solutions to precipitate additional silver therefrom. One chemical that could be used for this purpose is zinc powder.

Silver particles which have been separated by the filters of the apparatus of the present invention can be reclaimed in usable form by various methods. One such method would be to burn the filter material under controlled conditions to leave the silver behind. Another technique would be to use an appropriate acid bath to reclaim the silver.

While the invention has been described in connection with a preferred embodiment, it is not intended to limit the scope of the invention to the particular forms set forth, but, on the contrary, it is intended to cover such alternatives, modifications and equivalents as may be included within the spirit and scope of the invention as defined by the appended claims.

I claim:

1. A portable, countertop apparatus for recovering particles of a precious metal suspended in a liquid comprising:
   a tray including a bottom surface, a pair of end walls and a pair of side walls;
   a plurality of filters of successively smaller porosity through which a particle-containing liquid can be passed, each successive filter preventing precious metal particles of progressively smaller sizes suspended in said liquid from passing therethrough;
   a frame assembly comprising a separate frame for each of said filters, each frame having a border to which corresponding filter material can be affixed, the perimeter of each frame being adapted to fit snugly within said tray for supporting said filters in horizontally stacked relation within said tray;
   a plurality of ribs situated on each of said frames inwardly of the perimeter edges of the frame;
   a tray cover situated on top of said tray, said cover having an opening therein into which liquid can be manually poured; and
   a drainage port in communication with the interior of said tray to allow liquid poured into the tray and passing through the filters to drain out of the tray.

2. The apparatus of claim 1 wherein the ribs on each frame are arranged to define a plurality of distinct filter sections within each frame, each of the ribs disposed between adjacent filter sections having channels therein to allow the passage of liquid thereacross, thereby maintaining a uniform level of liquid among the filter sections as liquid is being poured therethrough.

3. The apparatus of claim 1 wherein the precious metal particles to be recovered from a liquid are silver particles suspended in photographic developing solutions and the porosities of at least two of said filters are within the range of from 250 microns to 400 microns.

4. The apparatus of claim 1 wherein said tray includes integral ledge means for supporting said frame assembly in raised relation above said bottom surface.

5. The apparatus of claim 4 wherein said tray includes a plurality of integral wedge shaped members against which portions of the perimeter of each frame can abut, said wedge shaped portions extending upwardly and inwardly toward the center of the tray from lower portions of said side and end walls.

6. The apparatus of claim 1 wherein said filters comprise sheets of screen cloth having mesh openings, the porosity of each filter being determined by the size of the mesh opening.

7. The apparatus of claim 6 wherein the screen cloth of at least one filter comprises monofilament polyester.

8. The apparatus of claim 7 further comprising an additional filter comprising a blend of fiberglass strand and microfibers containing a flexible acrylic binder.

9. The apparatus of claim 7 wherein each of said frames includes a plurality of ribs arranged to define a plurality of distinct filter sections within each frame, each of the ribs disposed between adjacent filter sections having channels therein to allow the passage of liquid thereacross.

* * * * *